United States Patent
Ito et al.

(10) Patent No.: US 7,209,328 B2
(45) Date of Patent: Apr. 24, 2007

(54) MAGNETIC READ HEAD AND HARD DISK DRIVE

(75) Inventors: Kenchi Ito, Cambridge (GB); Hiromasa Takahashi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 10/845,080

(22) Filed: May 14, 2004

(65) Prior Publication Data

US 2005/0002128 A1   Jan. 6, 2005

(30) Foreign Application Priority Data

May 16, 2003 (JP) ............................. 2003-138096

(51) Int. Cl.
*G11B 5/33* (2006.01)
(52) U.S. Cl. .................................................. 360/324.2
(58) Field of Classification Search ............. 360/324.2, 360/324.12, 324.1, 324.11
See application file for complete search history.

(56) References Cited

U.S. PATENT DOCUMENTS

| | | | | |
|---|---|---|---|---|
| 6,011,674 | A * | 1/2000 | Nakatani et al. | 360/324.2 |
| 6,563,682 | B1 * | 5/2003 | Sugawara et al. | 360/324.2 |
| 6,999,287 | B2 * | 2/2006 | Hayashi et al. | 360/324.12 |
| 7,031,119 | B2 * | 4/2006 | Watanabe et al. | 360/313 |
| 7,035,062 | B1 * | 4/2006 | Mao et al. | 360/324.2 |
| 2001/0040777 | A1 * | 11/2001 | Watanabe et al. | 360/321 |
| 2002/0084500 | A1 * | 7/2002 | Kang et al. | 257/421 |
| 2003/0039083 | A1 * | 2/2003 | Seyama et al. | 360/324.12 |
| 2005/0105222 | A1 * | 5/2005 | Sbiaa et al. | 360/324.1 |
| 2005/0219772 | A1 * | 10/2005 | Hayashi et al. | 360/324.2 |
| 2006/0152862 | A1 * | 7/2006 | Nakatani et al. | 360/324.2 |

OTHER PUBLICATIONS

"Electrical Detection of Spin Precession in a Metallic Mesoscopic Spin Valve" Jedema, et al. Nature: vol. 416, Apr. 2002, pp. 713-716.
Nikkei Electronics, No. 774, p. 177-184 (2000) and English translation.

* cited by examiner

*Primary Examiner*—Allen Cao
(74) *Attorney, Agent, or Firm*—Antonelli, Terry, Stout and Kraus, LLP.

(57) ABSTRACT

A magnetic head using a tunneling magnetoresistance effect realizing both high output and wide bandwidth. By providing a magnetic read head and magnetic reading/playback apparatus related to the present invention characterized by comprising: a lower magnetic shield, an upper magnetic shield, a first electrode layer formed on said lower magnetic shield, a first ferromagnetic layer laminated on one end of said first electrode layer through a first insulator, a second ferromagnetic layer laminated on another end of said first electrode layer through a second insulator, a detecting electrode connected to said first ferromagnetic layer, and a second electrode layer electrically connecting said second ferromagnetic layer with said upper magnetic shield; it becomes possible to reduce the capacitance between the first ferromagnetic layer and the insulator and widen the bandwidth of the detecting signal.

14 Claims, 7 Drawing Sheets

Face to the magnetic medium

Face to the magnetic medium

R:TMR resistance, C:Capacitance between the shields
L:Inductance of the output current, Z:Output impedance

MAGNETIC READ HEAD AND HARD DISK DRIVE

CLAIM OF PRIORITY

The present application claims priority from Japanese application JP 2003-138096 filed on May 16, 2003, the content of which is hereby incorporated into this application.

FIELD OF THE INVENTION

The present invention relates to a magnetic reading head and a magnetic recording/playback apparatus therein detecting a leakage flux from a magnetic recording medium and playing back information.

BACKGROUND OF INVENTION

The track size of a recording bit becomes finer with increasing memory density of a magnetic disc apparatus, and therefore, further high sensitivity is required of a magnetic playback head. In particular, in recent years, a magnetic playback head using a tunnel magnetoresistive effect (TMR) film has received attention as a next generation ultra-sensitive magnetic sensor as described in the document 1 (NIKKEI Electronics, No.774 (Jul. 17, 2000), pp. 177–184).

In this document 1, a structure of a read head is disclosed, wherein laminated layers consisting of a bottom magnetic shield, a soft magnetic free layer, a nonmagnetic insulator, a ferromagnetic fixed layer, an antiferromagnetic layer fixing the magnetization direction of a ferromagnetic fixed layer, and an electrode are formed in order on a bottom magnetic shield and then patterned. And it comprises a hard magnetic metal layer placed at both ends of the laminated layer to fix the magnetization direction and an insulating layer to insulate said top magnetic shield and bottom magnetic shield.

In addition, recently, a new type of TMR sensor was proposed as a sensor using the TMR effect as described, for example, in the document 2 (Nature, Vol. 416, pp. 713–715, 2002), wherein two laminated layers of insulator/ferromagnetic metal were formed at different positions of an Al metallic electrode layer, a current passed from said first ferromagnetic layer to said Al electrode, a polarized spin diffused to the Al electrode underneath another laminate layer of insulator/ferromagnetic metal, and a change in resistivity detected by changing the magnetization direction of the second ferromagnetic layer.

[Non-patent document 1] NIKKEI Electronics, No.774 (Jul. 17, 2000) pp. 177–184

[Non-patent document 2] Nature, Vol. 416, pp. 713–715, 2002

SUMMARY OF THE INVENTION

However, the following problems are present in the above-described prior art.

The TMR head for a next generation ultra-high density magnetic playback head disclosed in said document 1 requires reducing the distance of a pair of magnetic shields as much as possible to improve playback resolution, therefore it has a structure such that the bottom electrode is directly formed on the bottom shield and an antiferromagnetism layer, a bottom ferromagnetic layer, a barrier layer, a top ferromagnetic layer and a top electrode are formed thereon. The detection current is supplied through the top/bottom shield.

When the TMR head is viewed as an equivalent circuit, R is the electrical resistance between the TMR head electrodes, C the capacitance between a pair of shields, and L the inductance of the electrode wiring. In such a circuit the frequency bandwidth of the detected signal is proportional to the reciprocal of the product of R and C. Therefore, it is necessary to reduce the RC product as much as possible to achieve high speed transmission in a TMR head in the future.

However, because the track width of magnetic memory recording medium decreases with increasing memory density, the value of R which is proportional to the sensor area increases therewith. In order to avoid the theoretical problem and achieve a practical tunnel magnetoresistive type recording head suitable for a future magnetic recording/playback apparatus with ultra-high recording density, it is necessary to reduce significantly the read resistance. To realize this, the thickness of Al oxide which is a nonmagnetic insulator should be extremely thin, which is an extremely difficult problem from an industrial perspective.

Moreover, in the document 2, because no current flows in the second ferromagnetic layer/insulator, it is possible to avoid the bandwidth issue as described above, but the TMR ratio is smaller than that of the sensor film written in the document 1, therefore it is difficult to achieve a high output.

Additionally, a conventional TMR read head has a resistance change greater than several tens of percent at room temperature. However, because of the high resistance, the detecting bandwidth cannot be made greater in a structure with TMR films arranged in series between conventional shields. Furthermore, when the area of the signal detecting part of a read head becomes smaller with increasing density, there is a problem that the resistance increases, making it impossible to use as a read head in the future.

It is an object of the present invention to provide a magnetic read head using a tunnel magnetoresistive effect and a magnetic reading/playback apparatus therewith which are mutually compatible with high output and a wide bandwidth.

In order to achieve the goals described above, a magnetic read head and magnetic reading/playback apparatus related to the present invention are characterized by comprising: a lower magnetic shield, a upper magnetic shield, a first electrode layer formed on the lower magnetic shield, a first ferromagnetic layer laminated on one end of the first electrode layer through a first insulator, a second ferromagnetic layer laminated on another end of the first electrode layer through a second insulator, a detecting electrode connected to the first ferromagnetic layer, and a second electrode layer electrically connecting the second ferromagnetic layer with the upper magnetic shield, wherein a tunneling current flows between the second ferromagnetic layer and first electrode layer from the second electrode layer through the second insulator, and the direction of magnetization of a first ferromagnetic layer changes when applying an external magnetic field.

Accordance to the aspects described above, in a magnetic read head and magnetic reading/playback apparatus related to the present invention, a pair of shields with a large area is not connected, so that it is possible to reduce the capacitance between them and achieve a wide bandwidth and ultra-high sensitivity.

BRIEF DESCRIPTION OF THE DRAWINGS

FIG. 2 is a diagram illustrating the theory of operation of a magnetic playback head according to the present invention.

DESCRIPTION OF THE PREFERRED EMBODIMENT

Figure 1A:
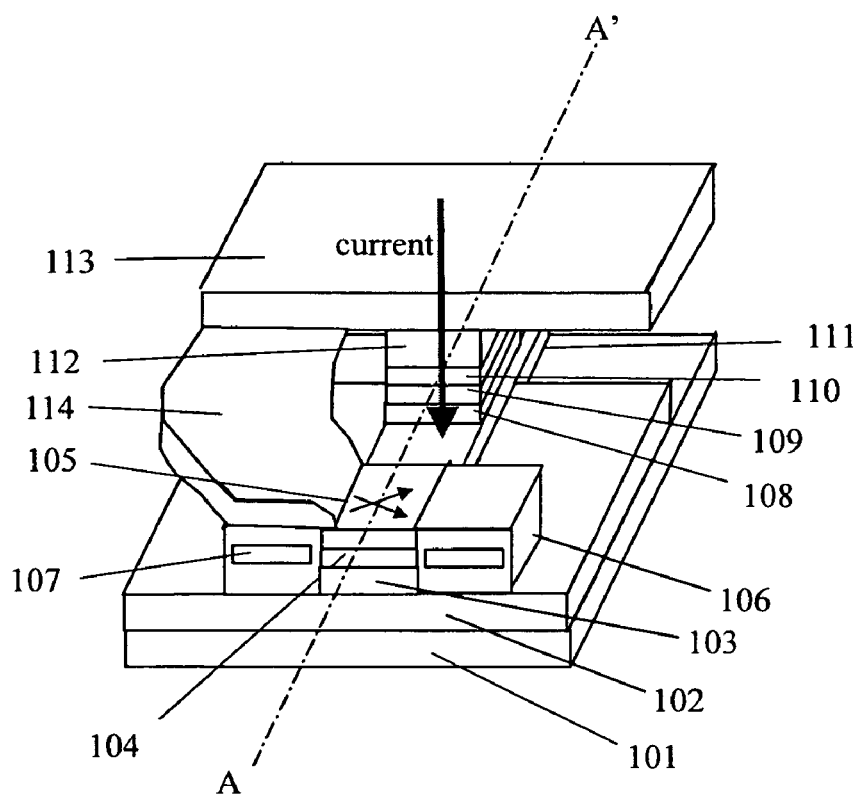
FIG. 1A shows a perspective diagram illustrating the first embodiment of a magnetic playback head according to the present invention.

The following is a detailed description of a preferred magnetic read head to which the present invention is applied.

A magnetic read head applying the present invention comprises the following as main components: a lower magnetic shield, an upper magnetic shield, a first electrode layer formed on the lower magnetic shield, a first ferromagnetic layer laminated on one end of the first electrode layer through a first insulator, a second ferromagnetic layer laminated on another end of the first electrode layer through a second insulator, a detecting electrode connected to the first ferromagnetic layer, and a second electrode electrically connecting the second ferromagnetic layer with the upper magnetic shield.

In this magnetic read head, a tunneling current flows between the second ferromagnetic layer and first electrode layer from the second electrode layer though the second insulator, and the direction of magnetization of the first ferromagnetic layer changes when an external magnetic field is applied.

Preferably, a bias layer is formed in this magnetic read head to apply a bias magnetic field to a second ferromagnetic layer.

Moreover, in the magnetic read head, the coercive force of the second ferromagnetic layer (pin layer) may be controlled to be greater than the coercive force in the first ferromagnetic layer (free layer). Furthermore, the direction of magnetization in the second ferromagnetic layer may be fixed in one direction. Especially, fixing the direction of magnetization is accomplished by an antiferromagnetism layer formed contacting the second ferromagnetic layer.

Moreover, in this magnetic read head, a permanent magnet layer may be formed on both sides of the first ferromagnetic layer to homogenize the magnetic domain structure of the first ferromagnetic layer.

In the material forming each layer of the magnetic read head, the ferromagnetism fixation layer of the second ferromagnetic layer is composed at least one oxide or compound of Co, Cr, and Mn. Or, the second ferromagnetic layer is formed with $Fe_3O_4$.

The first electrode layer is preferably formed with one selected from the group consisting of Al, Cu, or an alloy including them. Further, the first electrode layer is preferably formed with a semiconductor compound based on GaAs.

Especially, the most preferable structure is where an insulator and a ferromagnetic semiconductor layer constituting a compound of In- or Al-doped GaAs are formed on an electrode layer formed with a GaAs-based semiconductor compound. Additionally, any of Mn-doped GaAs, CrSb, CrAs, or Mn-doped GaN may be used for a ferromagnetic semiconductor.

In this magnetic read head, when an applied external magnetic field is almost zero, the magnetization direction of the second ferromagnetic layer of two ferromagnetic layers is set to be perpendicular to the layer facing the medium, and the magnetization direction of the first ferromagnetic layer is set to be parallel to the layer facing the medium.

Additionally, this magnetic read head may be an induction type thin film magnetic read head comprising an upper magnetic core, which is connected to a lower magnetic core through a magnetic gap film at the front part and connected directly to a lower magnetic core by a back contact part formed by a magnetic material at the rear part, and a nonmagnetic layer which is formed between the upper magnetic core and the lower magnetic core.

FIG. 1 is an embodiment of a magnetic recording/playback head according to the present invention.

Figure 1B:
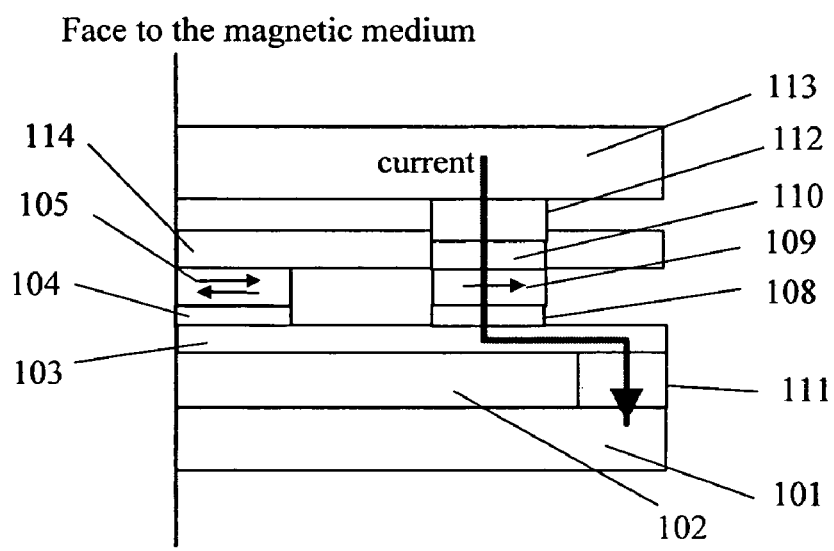
FIG. 1B is a cross-section of FIG. 1A.

FIG. 1A shows a perspective illustration of a magnetic playback head according to the present invention and FIG. 1B is a cross section of FIG. 1A cut at the line A–A'.

In FIG. 1, the insulator 102 is formed on the lower magnetic shield 101, and the first electrode layer 103 is formed on the insulator 102. Additionally, the first insulator 104 and the ferromagnetic layer (free layer) 105 are formed on one side of the first electrode layer facing the medium and, the second insulator 108, the second ferromagnetic layer (pin layer) 109, the antiferromagnetic layer 110, which fixes the magnetization direction of the second ferromagnetic layer 109 to be almost perpendicular to the face of the magnetic medium, and the second electrode layer 112 are laminated at a position far from the face of the magnetic medium in this order. The first electrode layer 103 is electrically connected to the lower magnetic shield 101 through the third electrode layer 111 formed at a position far from the face of the magnetic medium.

Moreover, a detecting electrode 114 is provided contacting the first ferromagnetic layer 105 to detect voltage deviations generated by a TMR effect.

The second electrode layer 112 is electrically connected to the upper magnetic shield 113. Here, current used for detection flows to the lower shield 101 through the second electrode 112, antiferromagnetic layer 110, the second ferromagnetic layer 109, the second insulator 108, and the first electrode layer 103. The detection voltage of the TMR effect is observed as a deviation of voltage between the first electrode layer 103 and the detecting electrode 114 which is provided contact with the first ferromagnetic layer.

Moreover, on both sides of the first ferromagnetic layer (free layer), the permanent magnet film 107, which works to homogenize the magnetic domain structure of the first ferromagnetic layer 105 and to turn the magnetization direction almost parallel to the face of the magnetic medium, is formed through the insulation 106.

The third electrode layer 111 may be connected with the first electrode layer 103. A process for manufacturing a magnetic read head can be simplified by installing the third electrode layer 111.

Referring to the drawing shown in FIG. 2, the action of a read head according to the present invention will be described.

Figure 2A:
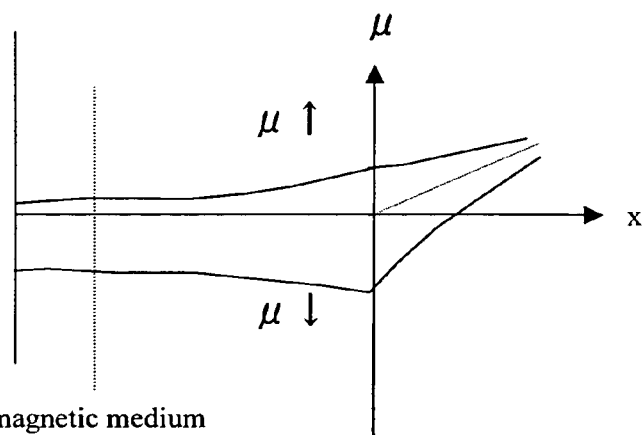
FIG. 2A shows a space distribution of spin polarized electrons and FIG. 2B shows a cross-section of a head.

FIG. 2A shows the upward spin density ($\mu\uparrow$) and the downward spin density ($\mu\downarrow$) at a coordinate position x provided in the first electrode layer 103 illustrated in FIG. 2 Bandwidth the second electrode layer 112.

Figure 2B:
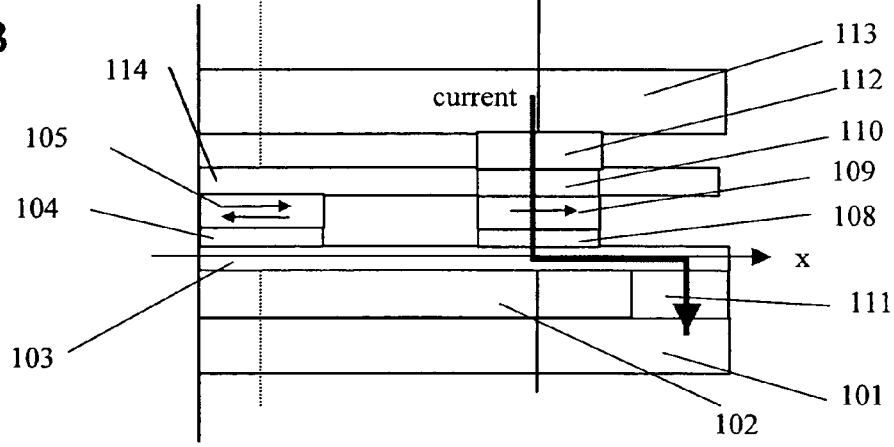

The position of X=0 is the center of the second ferromagnetic layer 109 in FIG. 2B.

As described above, when current flows from the upper magnetic shield 113 to the lower magnetic shield 101, different numbers of upward spin electrons and downward spin electrons are injected into the electrode layer 103 from the ferromagnetic layer 109 because the ferromagnetic layer 109 consists of a ferromagnetic material.

In FIG. 2A, because the ferromagnetic material is assumed to be negatively polarized, the number of downward spins injected into the electrode layer 103 is greater than the number of upward spins. When the electrode layer 103 is made of a material having a large spin diffusion length at room temperature such as Al, these spins diffuse in the direction of the first ferromagnetic layer 105 in which current does not flow.

Although the number of spins is reduced beneath the center of the first ferromagnetic layer 105 shown by the dotted line, the situation in which the number of downward spins is greater than the number of upward spins is still maintained. This is a situation where the electrode layer 103 can be considered to be effectively spin-polarizing, and a so-called tunneling magnetoresistance effect is observed, wherein the MR ratio changes depending on the magnetization direction of the upper ferromagnetic layer 105.

In the magnetic read head according to the present invention shown in FIG. 1, a current flows from the upper magnetic shield 113, through the part not detecting a signal, the second ferromagnetic layer 109/insulator 108, which is the TMR part, to the lower magnetic shield 101.

On the other hand, since the large area upper and lower magnetic shields (113 and 101) are not connected to the signal detecting part, the first ferromagnetic layer 105/insulator 104, the capacitance between them can be made extremely small. Additionally, because the area of the insulator 105 is extremely small, the capacitance between them can be significantly reduced.

Therefore, it is possible to reduce the CR product, which was pointed out as a problem, to a level which will be used for high density magnetic playback heads in the future. For instance, when $Al_2O_3$ is used for the insulator 105, the area-resistance product of 10 $\Omega \cdot \mu m^2$ can be consistently obtained; however, when the detecting area is assumed to be 50×50 nm, the resistance becomes 4 k$\Omega$.

However, because the capacitance itself can be made lower than 0.01 pF, CR becomes greater than $4 \times 10^{-11}$, and the bandwidth $f=(2\pi RC)^{-1}$ can be greater than 4 GHz. This frequency is the same as the ferromagnetic resonance frequency of the ferromagnetic material, therefore this TMR head can be used well up to the threshold frequency of the ferromagnetic material, and it is applicable enough for a high transmission speed in the future.

Figure 7A:
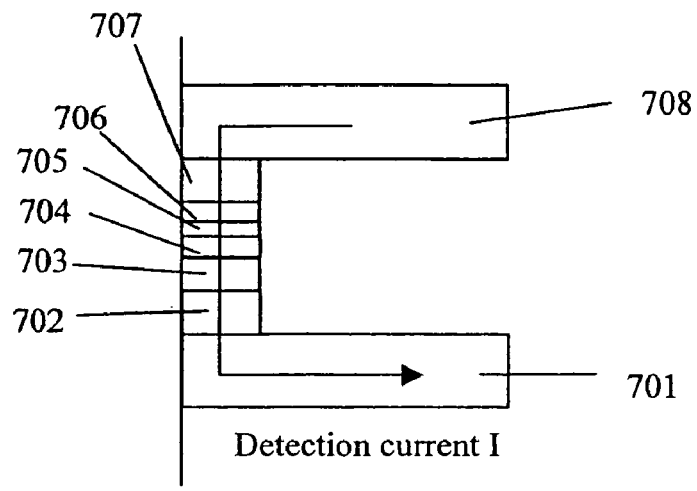
FIG. 7A shows a conventional ultra-high density magnetic playback head and FIG. 7B shows its equivalent circuit.
Figure 7B:
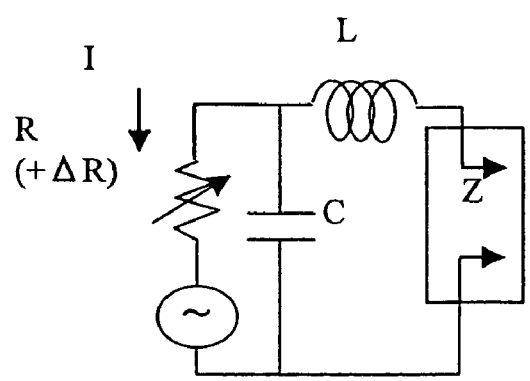

A TMR head for a conventional ultra-high density magnetic playback head shown in FIG. 7A is disclosed in the non-patent document 1. In a TMR head for future ultra-high density magnetic playback heads, reducing the distance between the magnetic shield 701 and 708 as much as possible is required to improve the playback resolution, therefore a structure is created in which the lower electrode 702 is formed directly above the lower magnetic shield 701, and on top of them are formed the antiferromagnetic layer 703, the lower ferromagnetic layer 704, barrier layer 705, the upper ferromagnetic layer 706 and the upper electrode 707. The detecting current is supplied through the upper and lower magnetic shields. Moreover, FIG. 7B shows an equivalent circuit of the TMR head illustrated in FIG. 7A.

According to the non-patent document 1, the amount of resistance change $\Delta R$ is given by the following expression 1.

$$\Delta R = P1 * P2 * \lambda / (\delta * A) * \exp(-L/\lambda) \qquad \text{(Expression 1)}$$

Here, P1 and P2 are the spin polarisabilities of the second ferromagnetic layers, $\lambda$ the spin diffusion length of the first electrode layer, $\sigma$ the electrical conductivity of the first electrode layer, A the cross-sectional area of the first electrode layer, and L the distance between two electrode layers. It is necessary to optimize the material to obtain a large $\Delta R$.

Next, the materials comprising each the layer used in the present invention will be described. The above-described first ferromagnetic layer 103 is the free layer which sensitively monitors the change of magnetization direction of the medium, therefore, NiFe or an alloy of NiFe and CoFe having excellent soft-magnetic properties is used because good soft-magnetic properties are necessary. At this time, the polarisability of the ferromagnetic layer P1 is about 0.4. For example, $Al_2O_3$, for which excellent characteristics are obtained, is suitable as a first insulating layer material, but oxides of Mg, Ta, and Hf. $SrTiO_3$, or nitrides such as AlN and TiN may also be used.

Al or Cu, which has a large spin diffusion length and small conductivity $\sigma$, is suitable as a material of the first electrode layer. There is also an advantage that an excellent oxide such as $Al_2O_3$ can be formed on these films.

The choice of material for the second ferromagnetic layer 109 is wider than that for the first ferromagnetic layer 105, but it is preferable to use a material with a polarisability P2 greater than the expression (1) shown in the number 1, for example a half-metal. In this embodiment, $Fe_3O_4$, a room temperature half-metal oxide, is used. Besides this material, perovskite type half-metal oxides such as LaSrMnO, SrFMnO, and LaCaMnO may be used. For instance, when TiN was used for the second barrier material 108, the polarisability P2 of $Fe_3O_4$ formed thereon was greater than 0.8.

The material for antiferromagnetic part 110 should be selected in accordance with the above-selected second ferromagnetic layer 109.

For instance, when $Fe_2O_3$ is selected as a material for the second ferromagnetic layer 109, CrMnPt is preferably used for the antiferromagnetic material 110.

When the materials described above are used, the first electrode width, that is, the playback tracking width, controlled to be 50 nm, and the distance L between two ferromagnetic layers 105 and 109 controlled to be 350 nm, which is the spin diffusion length of Al at room temperature, the amount of electrical resistance deviation obtained at room temperature is as large as 200 m$\Omega$, which is twenty times larger than that of the prior art. It is thought that this is due to using a half metal material with large polarisability for the second ferromagnetic layer 109 in this patented TMR head and fixing the magnetization direction with CrMnPt, which is an antiferromagnetic layer having excellent magnetization fixing properties.

Besides, as is understood from expression (1), using for the first electrode layer 103 a material with a small electrical conductivity and a large spin diffusion length, for example a semiconductor such as GaAs is also effective in obtaining a large amount of electrical resistance deviation.

For example, since the electrical conductivity of Si-doped GaAs at room temperature is about $10^4$ $\Omega^{-1} \cdot m^{-1}$, which is three orders of magnitude smaller than that of Al, an amount of electrical resistance deviation of two or three orders of magnitude greater than that of the prior art is expected.

In this case, it is preferable that Al- or In-doped GaAs be used for the barrier layers 108 and 104, and that a ferromagnetic semiconductor with the same crystal structure as GaAs, such as Mn-doped GaAs, CrAs, CrSb, or Mn-doped GaN, be used for the ferromagnetic layers 109 and 105. Especially, CrAs, CrSb and Mn-doped GaN are ferromagnetic semiconductors exhibiting half-metallic properties at room temperature, therefore, a large ratio in electrical resistance deviation can be obtained.

Figure 3A:
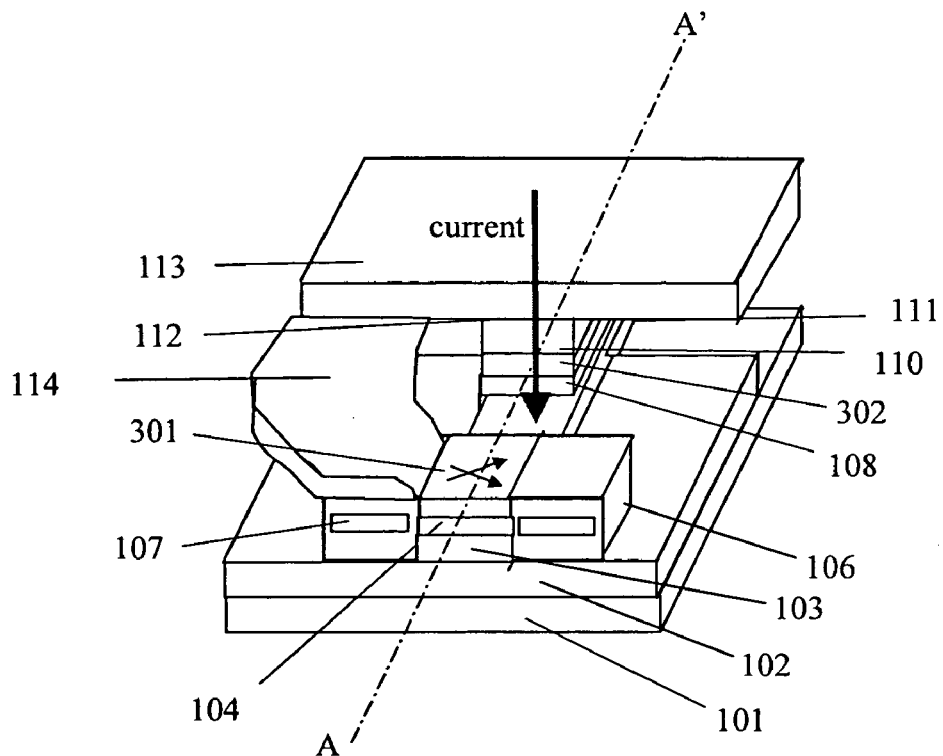
FIG. 3 shows a cross-section illustrating the second embodiment of a magnetic playback head according to the present invention.
Figure 3B:
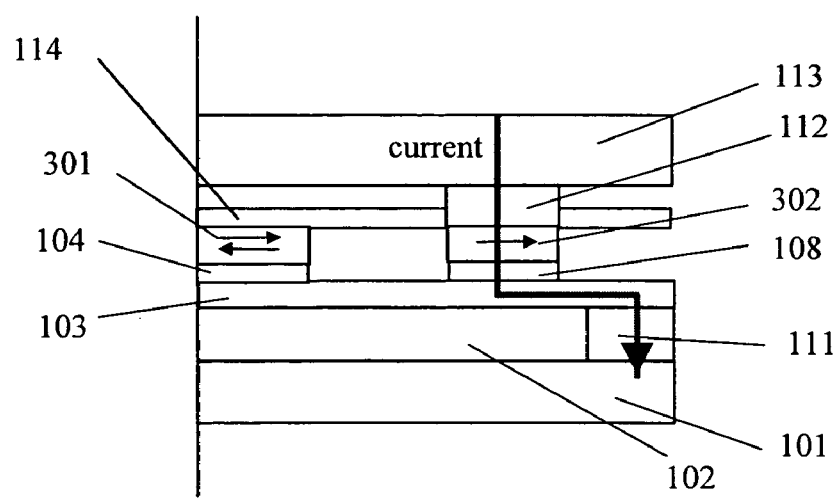

FIG. 3 is a cross-section illustrating the second embodiment according to the present invention. Compared to the first embodiment, this embodiment does not have the antiferromagnetic layer 110. In lieu of this layer, the first ferromagnetic layer 301 with a small coercive force and the second ferromagnetic layer 302 with a smaller coercive force than layer 301 are used in this embodiment.

Figure 4:
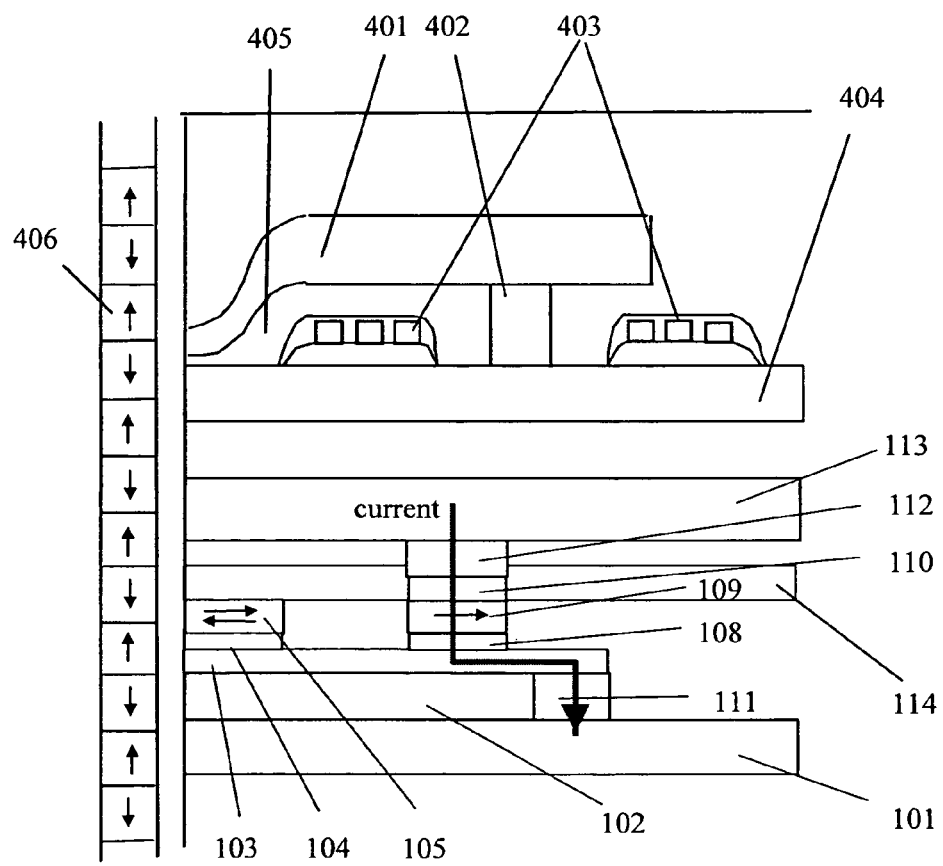
FIG. 4 shows a cross-section illustrating a magnetic playback head consisting of a tunneling effect type magnetic playback head and inductive type magnetic recording head according to the present invention.

FIG. 4 illustrates an embodiment of a magnetic recording/playback head which comprises forming an inductive type magnetic recording head on top of any magnetic playback head described in the previous embodiments.

An example applying the magnetic playback head described as the first embodiment in FIG. 1 is shown in FIG. 4. However, even if the other embodiment is used, a similar magnetic recording/playback head can be constructed only by exchanging the part of the magnetic playback head.

In FIG. 4, after forming the magnetic playback head shown in FIG. 1 on the substrate, a non-magnetic insulator is formed, and then the upper magnetic core 401 connected to the lower magnetic core is formed on the top of it through the lower magnetic core 404 and back contact part 402.

Around the back contact area, the coil 403, which is used for inducing magnetic flux in the magnetic core, is formed surrounded by the insulator 405. The above-described magnetic recording/playback head is installed in close proximity to the in-plane magnetic recording medium 406, which is in-plane magnetized, and therewith the recording and playback of information are carried out.

Figure 5:
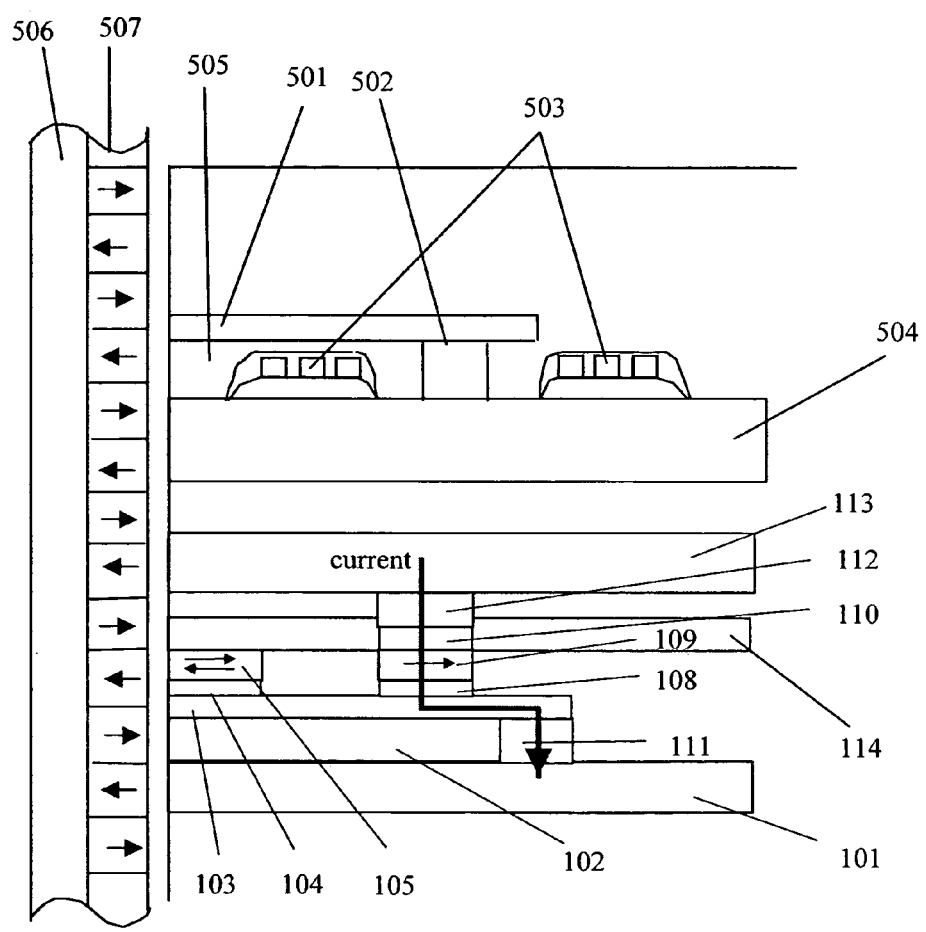
FIG. 5 shows a cross-section illustrating a magnetic recording/playback head consisting of a tunneling effect type magnetic playback head and a single magnetic pole magnetic recording head for vertical magnetic recording according to the present invention.

FIG. 5 illustrates an embodiment of a magnetic recording/playback head which comprised forming a single magnetic pole type vertical magnetic recording head on top of any magnetic playback head described in the previous embodiments. An example applying the magnetic playback head described as the first embodiment in FIG. 1 is shown in FIG. 5. However, even if the other embodiment is used, a similar magnetic recording/playback head can be constructed only by exchanging the part of the tunneling magnetoresistance type magnetic playback head.

In FIG. 5, after forming the magnetic playback head shown in FIG. 1 on the substrate, a non-magnetic insulator is formed, and then the single magnetic pole type upper magnetic core 501 connected to the lower magnetic core is formed on top of it through the lower magnetic core 504 and back contact part 502. The coil 503, which is used for inducing magnetic flux in the magnetic core, is formed surrounding with the insulator 505 around the back contact part. Above described magnetic recording/playback head is installed being cross the vertical recording layer 507 magnetized perpendicular to the medium surface and the vertical magnetic recording medium consisting of the soft magnetic backing layer 506, therewith the cord is recorded and playbacked.

Figure 6:
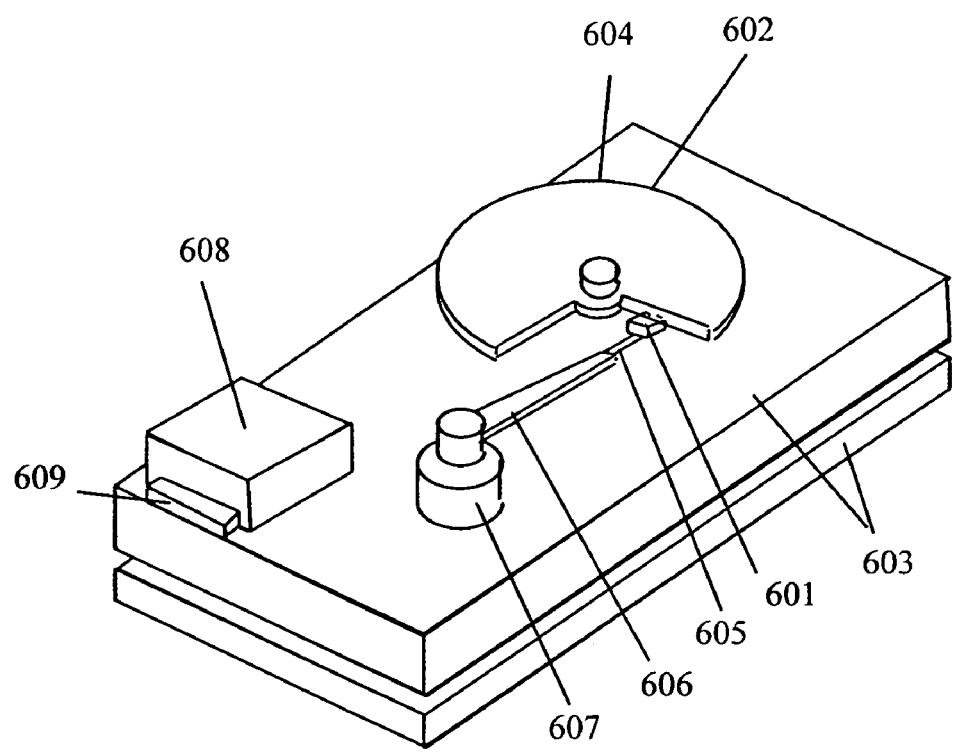
FIG. 6 is a schematic drawing illustrating an embodiment of a magnetic recording/playback apparatus having a magnetic playback head selected from any of the embodiments described in FIGS. 1–5 or a magnetic recording/playback head.

FIG. 6 is a schematic drawing illustrating a magnetic recording/playback apparatus having a slider 601, which consists of a magnetic playback head and a magnetic recording head described in the embodiments of FIGS. 1–5, and a recording disk 602. The recording disk 602 is attached to the axis 604 connected to the spindle motor (not shown in the FIG.) fixed to the base 603. The recording disk 602 spins through rotation of the spindle and moves relative to the slider 601. The slider 601 is fixed to the suspension 605 and the suspension 605 is attached to the arm 606. The arm 606 rotates around the axis 604 by the moving mechanism 607 and moves the slider 601 along the radius of the recording disk 602, thereby performing the tracking operations of accessing the code track and tracking to a pre-determined code track. The connector 609 is connected to the interface 608 which is attached to the base 603. Through the cables connected to the connector 609, the power supply to drive this apparatus, the recording/playback commands for the apparatus, the input of recorded information and the output of playback information etc. are transmitted.

According to the present invention, an ultra-high density magnetic recording/playback apparatus can be provided, which utilizes a magnetic recording/playback head, using a tunneling magnetic playback head capable of ultra-high sensitivity and high transmission speed.

What is claimed is:

1. A magnetic read head comprising:
    a bottom magnetic shield;
    a top magnetic shield;
    a first electrode layer formed on said bottom magnetic shield;
    a first ferromagnetic layer laminated on one end of said first electrode layer through a first insulator;
    a second ferromagnetic layer laminated on another end of said first electrode layer through a second insulator;
    a detecting electrode connected to said first ferromagnetic layer; and
    a second electrode layer electrically connecting said second ferromagnetic layer with said top magnetic shield, wherein a tunneling current flows between said second ferromagnetic layer and first electrode layer from said second electrode layer through said second insulator, and the direction of magnetization of a first ferromagnetic layer changes when applying an external magnetic field.

2. A magnetic playback head according to 1, wherein a bias layer applying a bias magnetic field to said second ferromagnetic layer is provided.

3. A magnetic read head according to 1, wherein an antiferromagnetic layer is laminated on said second ferromagnetic layer and said antiferromagnetic layer fixes the magnetization direction of the second ferromagnetic layer.

4. A magnetic read head according to 1, wherein the coercive force of a second ferromagnetic layer is greater than the coercive force of said first ferromagnetic layer.

5. A magnetic read head according to 1, wherein permanent magnet films are formed on both sides of said ferromagnetic layer.

6. A magnetic read head according to 1, wherein said first insulator and first ferromagnetic layer are formed on a side of said first electrode layer facing the medium, and said second insulator and second ferromagnetic layer are formed on the opposite end of said first electrode layer facing the medium.

7. A magnetic read head according to 1, wherein said second ferromagnetic layer includes at least one oxide or compound selected from Co, Cr, and Mn.

8. A magnetic read head according to 1, wherein a ferromagnetic layer of said ferromagnetic layer includes $Fe_3O_4$.

9. A magnetic read head according to 1, wherein said first electrode is made of Al, Cu, or an alloy including Al and Cu.

10. A magnetic read head according to 1, wherein said first electrode consists of a semiconductor compound based on GaAs.

11. A magnetic read head according to 1, wherein said second insulator is a compound where In or Al is added to GaAS, and said second ferromagnetic layer is a ferromagnetic semiconductor.

12. A magnetic read head according to 1, wherein said second ferromagnetic layer is a one selected from Mn-doped GaAs, CrSb, CrAs, or Mn-doped GaN.

13. A magnetic read head according to 1 comprising:
an upper magnetic core connected to a lower magnetic core through a magnetic gap film at the front part and connected directly to a lower magnetic core by a back contact part formed by a magnetic material at the rear part; and
a recording part consisting of nonmagnetic metal layer formed between a top core and a bottom core.

14. A magnetic recording/playback apparatus comprising a magnetic recording medium and a magnetic head, wherein said magnetic head comprises:
a bottom magnetic shield;
a top magnetic shield;
a first electrode layer formed on said bottom magnetic shield;
a first ferromagnetic layer laminated on one end of said first electrode layer through a first insulator;
a second ferromagnetic layer laminated on another end of said first electrode layer through a second insulator;
a detecting electrode connected to said first ferromagnetic layer; and
a second electrode layer electrically connecting said second ferromagnetic layer with said top magnetic shield,
wherein a tunneling current flows between said second ferromagnetic layer and first electrode layer from said second electrode layer through said second insulator, and the direction of magnetization of a first ferromagnetic layer changes when applying an external magnetic field.

* * * * *